(12) United States Patent
Treger

(10) Patent No.: US 8,268,481 B2
(45) Date of Patent: Sep. 18, 2012

(54) NANO-SIZED SILICON

(75) Inventor: Jack Treger, Quincy, MA (US)

(73) Assignee: Tiax LLC, Lexington, MA (US)

(*) Notice: Subject to any disclaimer, the term of this patent is extended or adjusted under 35 U.S.C. 154(b) by 971 days.

(21) Appl. No.: 12/207,821

(22) Filed: Sep. 10, 2008

(65) Prior Publication Data

US 2009/0092899 A1   Apr. 9, 2009

Related U.S. Application Data

(60) Provisional application No. 60/993,200, filed on Sep. 10, 2007.

(51) Int. Cl.
*H01M 4/02* (2006.01)

(52) U.S. Cl. ....... 429/209; 429/128; 429/188; 29/623.1; 252/521.3

(58) Field of Classification Search .................. None
See application file for complete search history.

(56) References Cited

U.S. PATENT DOCUMENTS

2006/0134516 A1* 6/2006 Im et al. .............. 429/218.1
2006/0286439 A1* 12/2006 Fujikawa et al. ............ 429/62

FOREIGN PATENT DOCUMENTS

WO   2005/011030   2/2005

* cited by examiner

*Primary Examiner* — Ula C Ruddock
*Assistant Examiner* — Scott J Chmielecki

(57) ABSTRACT

A method includes combining fumed silicon oxide with a metal to form silicon having an average particle size of less than approximately 100 nm. The silicon can be incorporated into an anode of a lithium ion cell.

29 Claims, 1 Drawing Sheet

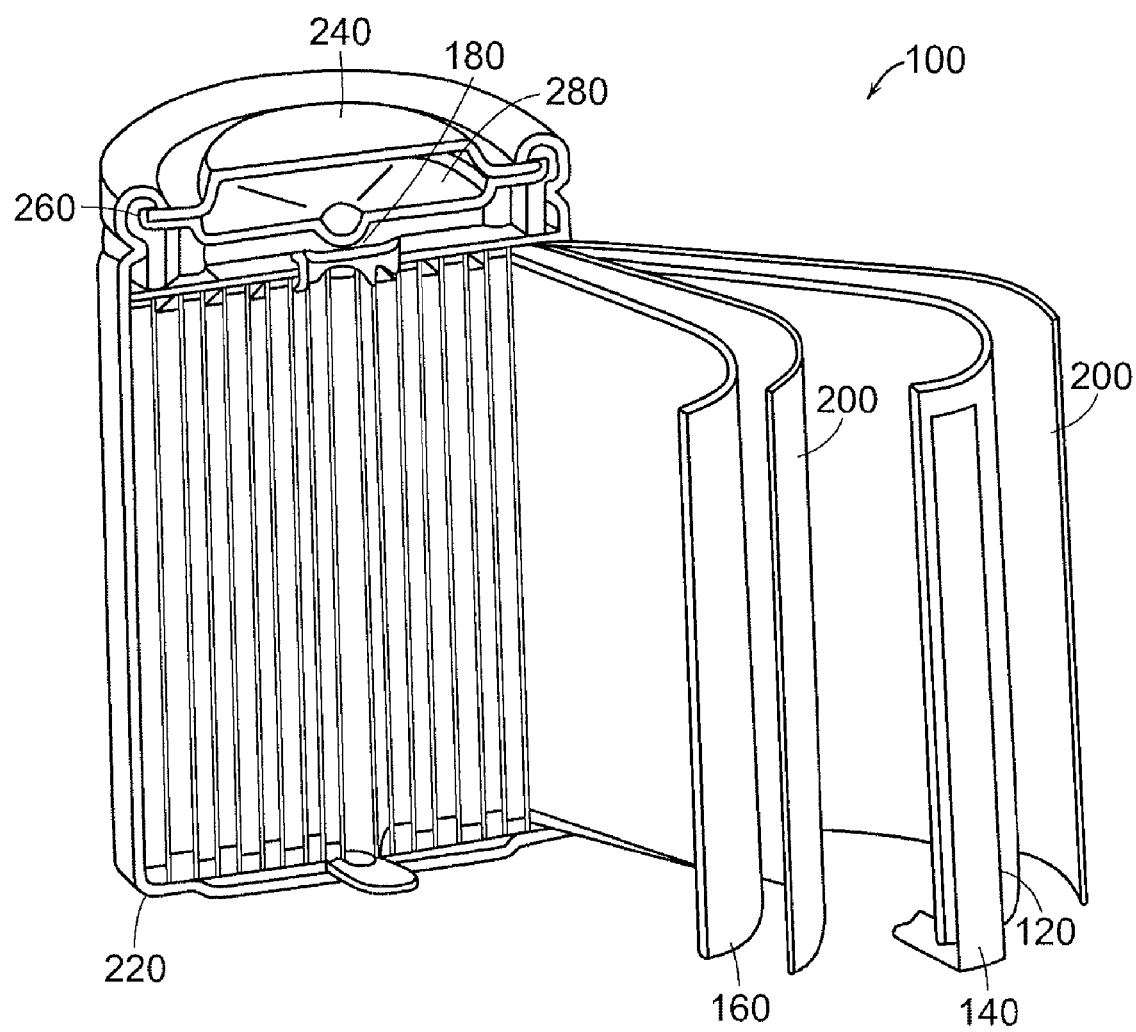

US 8,268,481 B2

NANO-SIZED SILICON

CLAIM OF PRIORITY

This application claims priority to U.S. Provisional Patent Application 60/993,200, filed on Sep. 10, 2007, and entitled "Nano-sized Silicon Powder", hereby incorporated by reference.

STATEMENT OF FEDERALLY-SPONSORED RESEARCH

The U.S. government may have certain rights under contract number US DOE, DE-FG02-06ER84580.

FIELD OF THE INVENTION

The invention relates to nano-sized silicon.

BACKGROUND

Silicon is a promising high capacity anode material for lithium-ion cells but can suffer from poor cycle life and capacity fade (or loss of capacity upon each subsequent cycle) due to the high volumetric changes that can occur during lithium insertion/de-insertion.

Briefly, lithium-ion batteries are light weight, high energy, and long cycle life secondary (i.e., rechargeable) batteries. Lithium-ion batteries including non-aqueous electrolytes can be used as power sources for portable electronic devices such as notebook personal computers, mobile phones, digital cameras, camcorders and so on. These lithium-ion batteries are also being evaluated as power sources for hybrid electric vehicles (HEV) and plug-in HEV (PHEV).

Lithium-ion batteries are typically prepared from one or more lithium-ion cells containing electrochemically active materials. A cell generally includes a pair of electrodes (i.e., an anode and a cathode) and a separator that electrically separates the electrodes, but allows ions to pass through it. An electrolyte is dispersed within the cell to maintain charge balance during charging and discharging. The electrolyte can include a lithium salt (e.g., $LiPF_6$) dissolved in one or more liquid solvents (such as aprotic organic solvents) or incorporated in one or more solid polymers (such as polyacrylonitrile). The anode of a lithium-ion cell can include an intercalation material. Examples of intercalation materials include carbonaceous materials, such as coke, mesocarbons (e.g., mesocarbon microbeads (MCMBs)), glassy carbons, amorphous carbon, and graphite. The cathode of a lithium-ion cell can include a lithium metal oxide, such as $LiCoO_2$, $LiNiO_2$, or $LiMn_2O_4$.

A lithium-ion cell typically is not charged in its initial condition. To deliver energy, such a cell is typically charged so lithium ions are released from the lithium-containing cathode, transferred to the anode, and intercalated at the anode. During discharge, a reverse process occurs to deliver an electrical current through an external load. Upon subsequent charge and discharge, the lithium ions are transported between the anode and cathode.

SUMMARY

The invention relates to nano-sized silicon, methods of making the silicon, and cells or batteries including the silicon. For example, the silicon can be used as an electrochemically active electrode material in batteries, including lithium ion batteries.

Nano-sized silicon can have less capacity fade and better cycle life than larger particle size silicon because volumetric changes can be less. Capacity fade and cycle life can be further improved by embedding the nano-silicon in an electrically and ionically conductive matrix such as carbon or graphite. Additional improvements of capacity fade and cycle life can be achieved by cycling silicon anodes above 50 mV versus Li to limit the formation of crystallized phases such as $Li_{15}Si_4$, which can limit cycle life.

In one aspect, the invention features a method, including combining fumed silicon oxide with a metal to form silicon having an average particle size of less than approximately 100 nm.

Embodiments may include one or more of the following features. The fumed silicon oxide has an average particle size of less than approximately 100 nm, e.g., less than approximately 50 nm. The metal is selected from the group consisting of Mg, Ca, Al, Li, Na, K, Cs, Sr, Ba, Ti and Zr. Forming the silicon includes heating the fumed silicon oxide and the metal to greater than approximately 100° C. The heating includes a heating rate of less than approximately 5° C./min. Forming the silicon includes combining the fumed silicon oxide and an excess equivalent of the metal. Forming the silicon includes removing at least a portion of metal oxide formed by combining the fumed silicon oxide and the metal. Removing at least a portion of metal oxide including contacting the silicon with an acid. The method further includes combining, with the fumed silicon oxide and the metal, a material (e.g., a halide) capable of dissolving an oxide on the metal to form the silicon. Forming the silicon includes contacting the fumed silicon oxide and the metal to a metal container. The method further includes combining a lithium-containing material with the fumed silicon oxide and the metal. The method further includes forming a lithium ion cell including an anode including the silicon.

In another aspect, the invention features a method, including forming a lithium ion cell including an anode including silicon, wherein the silicon is formed by combining fumed silicon oxide with a metal.

Embodiments may include one or more of the following features. The fumed silicon oxide has an average particle size of less than approximately 100 nm, e.g., less than approximately 50 nm. The metal is selected from the group consisting of Mg, Ca, Al, Li, Na, K, Cs, Sr, Ba, Ti and Zr. The silicon is formed by heating the fumed silicon oxide and the metal to greater than approximately 100° C. The silicon is formed using a heating rate of less than approximately 5° C./min. The silicon is formed by combining the fumed silicon oxide and an excess equivalent of the metal. Forming the silicon includes removing at least a portion of metal oxide formed by combining the fumed silicon oxide and the metal. Removing at least a portion of metal oxide includes contacting the silicon with an acid. Forming the silicon includes combining, with the fumed silicon oxide and the metal, a material (e.g., a halide) capable of dissolving an oxide on the metal to form the silicon. Forming the silicon includes contacting the fumed silicon oxide and the metal to a metal container. Forming the silicon includes combining a lithium-containing material with the fumed silicon oxide and the metal.

In another aspect, the invention features a lithium ion cell, including a cathode, and an anode including silicon, a separator between the cathode and the anode, and a non-aqueous electrolyte, wherein the silicon is formed by combining fumed silicon oxide with a metal.

Embodiments may include one or more of the following features. The fumed silicon oxide has an average particle size of less than approximately 100 nm, e.g., less than approximately 50 nm. The metal is selected from the group consisting of Mg, Ca, Al, Li, Na, K, Cs, Sr, Ba, Ti and Zr. The silicon is formed by heating the fumed silicon oxide and the metal to greater than approximately 100° C. The silicon is formed using a heating rate of less than approximately 5° C./min. The silicon is formed by combining the fumed silicon oxide and an excess equivalent of the metal. Forming the silicon includes removing at least a portion of metal oxide formed by combining the fumed silicon oxide and the metal. Removing at least a portion of metal oxide includes contacting the silicon with an acid. Forming the silicon includes combining, with the fumed silicon oxide and the metal, a material (e.g., a halide) capable of dissolving an oxide on the metal to form the silicon. Forming the silicon includes contacting the fumed silicon oxide and the metal to a metal container. Forming the silicon includes combining a lithium-containing material with the fumed silicon oxide and the metal.

Embodiments may include one or more of the following features or advantages.

Silicon with nano-sized grains can be produced, and the silicon can be produced with good yield.

Nano-sized silicon can be produced inexpensively, which allows products (such as lithium ion cells) including the nano-sized silicon to be produced inexpensively.

Cells including the nano-sized silicon may have good cyclability and/or electrochemical capacity.

As used herein, "nano-sized silicon" means silicon having an average particle size of approximately 1 nm to approximately 100 nm. Nano-sized silicon can have an average particle size of less than approximately 80 nm, less than approximately 60 nm, or less than approximately 50 nm. The smallest average particle size can be approximately 5 nm, approximately 7 nm, or approximately 10 nm.

As used herein, "nano-sized silica" means silica having an average particle size of approximately 1 nm to approximately 100 nm. In some embodiments, the silica powder has a purity of greater than approximately 95% (e.g., greater than approximately 97%, greater than approximately 98%).

An electrochemical cell can be a primary cell or a secondary cell. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

The terms "cell" and "battery" are used interchangeably.

The details of one or more embodiments are set forth in the accompanying description below. Other aspects, features, and advantages of the invention will be apparent from the following drawings, detailed description of embodiments, and also from the appending claims.

BRIEF DESCRIPTION OF DRAWING

The FIGURE is an illustration of an embodiment of a lithium-ion electrochemical cell.

DETAILED DESCRIPTION

Referring to the FIGURE, a lithium-ion electrochemical cell 100 includes an anode 120 in electrical contact with a negative current collector 140, a cathode 160 in electrical contact with a positive current collector 180, a separator 200, and a non-aqueous electrolyte. Anode 120 and cathode 160 can include any material capable of reversibly receiving and releasing, respectively, lithium ions during the charging process and reversibly releasing and receiving, respectively, these ions during the discharging process of a lithium-ion battery. Anode 120, cathode 160, separator 200, and the electrolyte are contained within a case 220 to maintain charge balance.

More specifically, anode 120 includes, among other things, nano-sized silicon powder produced by a thermo-chemical reaction between nano sized silicon oxide (sometimes known as fumed silicon oxide or fumed silica) and a metal powder (M) to produce the nano-sized silicon and a metal oxide product. The reaction can be generally expressed as:

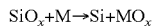

$$SiO_x + M \rightarrow Si + MO_x$$

where M acts as a reducing agent and can include one or more metals such as Mg, Ca, Al, Li, Na, K, Cs, Sr, Ba, Ti and/or Zr. Some specific examples are:

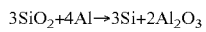

$$3SiO_2 + 4Al \rightarrow 3Si + 2Al_2O_3$$

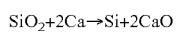

$$SiO_2 + 2Ca \rightarrow Si + 2CaO$$

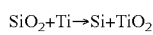

$$SiO_2 + Ti \rightarrow Si + TiO_2$$

In some embodiments, stoichiometric equivalents of fumed silica and metal are combined. In other embodiments, non-stoichiometric equivalents of fumed silica and metal are combined. For example, an equivalent ratio of approximately 0.9 fumed silica: approximately 1.1 M, or approximately 1 fumed silica: approximately 1.1 M can be used. An excess equivalent of metal (e.g., 1 fumed silica:>1 M) can help conversion of the fumed silica to silicon and prevent fumed silica from remaining in the nano-sized silicon product.

In some embodiments, forming nano-sized silicon is facilitated by adding a high temperature solvent, or flux, capable of dissolving an oxide coating on the metal (M) when the flux is molten. The oxide coating can passivate the metal (M) and inhibit reaction between the metal and the fumed silica. By dissolving the oxide coating, more reactive surfaces of the metal (M) are exposed, which can increase the yield of silicon and decrease the grain size of the silicon. Examples of fluxes include halides such as fluorides (e.g., $KAlF_4$, $LiAlF_4$), chlorides, bromides and/or iodides. The amount of flux can be less than approximately 5 wt %, for example, less than approximately 4 wt % or less than approximately 2 wt %.

In some embodiments, a lithium-containing material is combined with the fumed silica and metal. For example, if the nano-sized silicon is used in an anode of a lithium-ion cell, the lithium-containing material can enhance conductivity characteristics of lithium ions, and/or improve volumetric changes and strain alleviation effects of the metal oxide(s) ($MO_x$). Examples of lithium-containing materials include $Li_2O$, $Li_2O_2$, $LiNO_3$ and $Li_2S$.

The thermo-chemical reaction includes intimately combining the reactants, with or without the flux and/or lithium-containing material, and heating the reactants. For example, fumed silica and metal powder can be milled together at room temperature to provide a mixture in which the reactants are in intimate contact. The milling can be done under inert atmosphere, such as argon, to help prevent pre-ignition of the mixture. Milling can be performed in a ball mill or a vibration mill, for example. After the reactants are milled, the mixture can be pelletized to maintain contact of the powders. The pellet can then be placed in a heat-sinked boat or container including a heat-sink material, such as a highly thermally conductive metal (e.g., copper or brass). Heat sinking the pellet helps to prevent the pellet from igniting and/or a thermal runaway reaction from occurring. A thermal runaway reaction (e.g., in which the temperature of the pellet exceeds the temperature of the furnace by more than 50° C.) can result in large silicon particle size and byproducts, such as metal silicates that can be electrochemically inert and/or difficult to wash away. In some embodiments, a pellet (e.g., a cylindrical pellet) sits on its side edge in a container, and both faces of the pellet contact the heat-sink material, which can be a heat-sink container (e.g., a metal boat) or heat-sink material placed between and contacting both the pellet and the container.

After a heat-sinked pellet prepared, the pellet is heated under an inert atmosphere to produce nano-sized silicon and metal oxide(s). The heating profile can depend on the metal powder in the reaction. In some embodiments, the pellet is heated to reaction temperatures greater than approximately 200° C. (e.g., greater than approximately 400° C., greater than approximately 600° C.). The maximum reaction temperature can be the melting point of the metal, or if multiple metals are included in the reaction, the lowest melting point of the metals. Typically, higher reaction temperatures and/or longer heating times can undesirably increase grain growth, but the reaction temperatures and/or the heating times are selected to produce good yield of nano-sized silicon in a reasonable amount of time. To further help produce silicon with small grain sizes, the heating profile can include heating the pellet to one or more intermediate temperatures (e.g., at 300° C., at 400° C., and/or at 500° C.) between room temperature and a final reaction temperature (e.g., 700° C.), and holding the pellet at the intermediate temperature(s) for a period of time (e.g., 1-3 hr). Alternatively or additionally, a slow heating rate, such as approximately 0.5° C./min to approximately 5° C./min (e.g., approximately 2° C./min to approximately 5° C./min) can be used. Heating to and holding at intermediate temperature(s) and/or heating slowly can inhibit thermal runaway reactions, produce silicon with small grain sizes, and/or provide more complete conversion of fumed silica to silicon. Both heat sinking and the heating described above can be used to produce nano-sized silicon.

As an example, differential scanning calorimetry indicates that in the case of magnesium, the thermo-chemical reaction starts at about 350° C. and the reaction rate increases above 350° C. For magnesium, the heating profile can include heating from room temperature to 200° C. at 5° C./min, holding at 200° C. for 1 hr, ramping to 350° C. at 2° C./min, holding at 350° C. for 2 hr, ramping to 375° C. at 2° C./min, holding at 375° C. for 3 hr, ramping 400° C. at 2° C./min, holding at 400° C. for 3 hr, ramping to 450° C. at 2° C./min, holding at 450° C. for 1 hr, ramping to 500° C. at 2° C./min, holding at 500° C. for 2 hrs, ramping to 650° C. at 2° C./min, holding at 650° C. for 1 hr, ramping to 700° C. at 2° C./min, holding at 700° C. for 1 hr, and turning off the furnace to cool it.

After the heating is performed, the nano-sized silicon product can be isolated or separated from at least a portion of the metal oxide ($MO_x$) product(s). In some embodiments, the metal oxide product is dissolved in a solution that does not dissolve the nano-sized silicon. Examples of solvents include water, acids (such as sulfuric acid, nitric acid, hydrochloric acid, and/or acetic acid) and complex forming anions (such as aqueous ethylenediamminetetracetic acid, etidronic acid, nitrilotriacetic acid, citrates and/or chlorides). In some embodiments, after removing at least some of the metal oxide, the result is a high purity nano-sized silicon powder (e.g., at least equal to or more than approximately 80% nano-sized silicon, at least equal to or more than approximately 85% nano-sized silicon, or at least equal to or more than approximately 90% nano-sized silicon, as detected by powder X-ray diffraction).

In other embodiments, the metal oxide ($MO_x$) product(s) (e.g., MgO) is not separated from the nano-sized silicon. Without being bound by theory, it is believed that the metal oxide product(s) may protect the nano-sized silicon from being passivated by the electrolyte and forming an electrically insulating film, which can lower the performance of cell 100. Additionally, the metal oxide product(s) may allow anode 120 to undergo volumetric changes more easily during charging and discharging of cell 100.

Anode 120 can be produced by combining the nano-sized silicon produced above with one or more binders and one or more conductive aids. Examples of binders include polyvinylidene fluoride, styrene-butadiene, and carboxymethylcellulose (CMC). The amount of binder can range from approximately 5 wt % to approximately 20 wt %. Examples of conductive aids include graphite, acetylene black, and copper. The amount of conductive aids can range from approximately 5 wt % to approximately 80 wt %.

As indicated above, cathode 160 can include any material capable of reversibly releasing lithium ions during the charging process and reversibly receiving (e.g., by insertion/deinsertion or intercalation/deintercalation) these ions during the discharging process of a lithium-ion cell. Examples of materials that can be included in cathode 160 are layered type lithium metal oxides, such as $LiCoO_2$, $LiNiO_2$, $LiNi_xCo_yM_zO_2$ (wherein M is a metal selected from Al, Mg, Ti, B, Ga and Si; and 0.0<x, y, z<1 and x+y+z=1), $LiMn_{0.5}Ni_{0.5}O_2$ and $LiNi_{1/3}Co_{1/3}Mn_{1/3}O_2$; olivine type materials, such as $LiFePO_4$, $LiCoPO_4$ and $LiMnPO_4$; spinel-type materials, such as $LiMn_2O_4$ and $LiNi_{0.5}Mn_{1.5}O_4$; vanadium oxide; and mixtures of any two or more thereof.

Separator 200 can include any material capable of providing electrical isolation between cathode 160 and anode 120, while allowing ions to pass through the separator. Examples of materials that can be included in separator 200 include microporous single layer of polyethylene (PE), microporous single layer of polypropylene (PP), microporous PP/PE/PP tri-layer separator, and polyolefin/inorganic hybrid microporous separator.

The electrolyte may be a solid or liquid non-aqueous electrolyte. Examples of solid electrolytes include polymeric electrolytes such as lithium salt complexes of polyethylene oxide, or dimensionally stable lithium salt solutions of gelled polymers such as polyphosphazene, and combinations thereof. Examples of liquid electrolyte solvents include ethylene carbonate, diethylene carbonate, propylene carbonate, and combinations thereof. The electrolyte can be provided with a lithium electrolyte salt. Examples of salts include $LiPF_6$, $LiBF_4$, and $LiClO_4$.

The following examples are illustrative and not intended to be limiting.

Example 1

Mg Reducer, Heat Sinking and Slow Thermal Ramp 3.67 grams of fumed $SiO_2$ (Aldrich #89376, 9% water) and 3.0 grams of −325 mesh Mg powder were milled with 50 grams of steel balls for 30 minutes, pelletized at 6 tons/in$^2$, and inserted into a slotted 300 gram copper heat sink firing boat. The slot diameter was approximately the same diameter as the pellets, and any excess space was filled with copper foil to provide good thermal contact. The pellet was then fired under argon using a heating profile of 200° C. for 1 hr, then to 350° C. for 2 hr, then to 375° C. for 3 hr, then to 400° C. for 3 hr, then to 450° C. for 1 hr, then to 500° C. for 2 hr, then to 650° C. for 1 hr, and then to 700° C. for 1 hr, with a heating ramp rate of 2° C./min.

The resulting product contained approximately 21 wt % Si, approximately 76 wt % MgO and approximately 3% $SiO_2$ (as identified by X-ray diffraction) with a silicon grain size of approximately 8 nm (derived using the Scherrer equation). After the product was washed several times with 20 wt % $H_2SO_4$, rinsed with water and dried, the resulting product was approximately 95 wt % Si and approximately 5 wt % $SiO_2$.

Example 2

Mg Reducer, No Heat Sinking, Fast Thermal Ramp 3.67 grams of fumed $SiO_2$ (Aldrich #89376, 9% water) and 3.0 grams of −325 mesh Mg powder were milled with 50 grams of steel balls for 30 minutes, and pelletized at 6 tons/$in^2$. The pellet was fired in a non-heat sink alumina boat under argon using a heating profile of 200° C. for 1 hr, and then to 700° C. for 6 hr, with a heating ramp rate of 5° C./min.

The resulting product contained approximately 19 wt % Si, approximately 52 wt % MgO and approximately 29 wt % Mg silicate (as identified by X-ray diffraction) with a silicon grain size of approximately 40 nm (derived using the Scherrer equation). After the material was washed several times with 20% $HNO_3$, rinsed with water and dried, the resulting product was approximately 87 wt % Si, approximately 1.5 wt % MgO and approximately 11 wt % magnesium silicate.

Example 3

Al Reducer, No Heat Sinking, Fast Thermal Ramp, No Flux 1.28 grams of fumed $SiO_2$ (Aldrich #89376, 9% water) and 0.76 grams three-micron Al powder were milled with 50 grams of steel balls for 30 minutes, and pelletized at 6 tons/$in^2$. The pellet was heated under argon from room temperature to 200° C. at a heating rate of 5° C./min, held at 200° C. for 2 hr, heated to 700° C. at a heating rate of 5° C./min, held at 700° C. for 2 hr, and then allowed to cool to room temperature.

The resulting product contained approximately 14 wt % Si, approximately 76 wt % $Al_2O_3$ and approximately 10 wt % Al (as identified by X-ray diffraction) with a silicon grain size of approximately 77 nm (derived using the Scherrer equation).

Example 4

Al Reducer, No Heat Sinking, Fast Thermal Ramp, 1% Flux 1.28 grams of fumed $SiO_2$ (Aldrich #89376, 9% water), 0.76 grams three-micron Al powder and 0.024 g $KAlF_4$ (Nocolok™—Solvay Fluorides Inc.) were milled with 50 grams of steel balls for 30 minutes, pelletized at 6 tons/$in^2$. The pellet was heated under argon from room temperature to 200° C. at a heating rate of 5° C./min, held at 200° C. for 2 hr, heated to 700° C. at a heating rate of 5° C./min, held at 700° C. for 2 hr, and then allowed to cool to room temperature.

The resulting product contained approximately 26 wt % Si and approximately 74 wt % $Al_2O_3$ (as identified by X-ray diffraction) with a silicon grain size of approximately 79 nm (derived using the Scherrer equation).

Other embodiments are within the scope of the following claims.

What is claimed is:

1. A lithium ion cell, comprising:
   (1) a cathode,
   (2) an anode, comprising a silicon-containing product,
   (3) a separator, between the cathode and the anode, and
   (4) a non-aqueous electrolyte,
   wherein the silicon-containing product comprises
      (i) silicon having an average particle size of less than approximately 100 nm
      (ii) magnesium oxide, and
      (iii) magnesium silicate.

2. The cell of claim 1, wherein the silicon oxide has an average particle size of less than approximately 80 nm.

3. The cell of claim 1, wherein the silicon has an average particle size of less than approximately 50 nm.

4. The cell of claim 1, wherein the silicon-containing material further comprises lithium.

5. The cell of claim 1, wherein the silicon-containing product comprises (i) at least approximately 80 wt % of the silicon.

6. The cell of claim 1, wherein the silicon-containing product comprises (i) at least approximately 85 wt % of the silicon.

7. The cell of claim 1, wherein the silicon-containing product comprises (i) at least approximately 90 wt % of the silicon.

8. The cell of claim 1, wherein the silicon-containing product comprises (ii) approximately 1.5 to 52 wt % of the magnesium oxide.

9. The cell of claim 1, wherein the silicon-containing product comprises (iii) approximately 11 to 29 wt % of the magnesium silicate.

10. The cell of claim 1, wherein the silicon-containing product comprises
    (i) at least approximately 80% of the silicon,
    (ii) at least approximately 1.5 wt % of the magnesium oxide, and
    (iii) at least approximately 11 wt % of the magnesium silicate.

11. The cell of claim 1, wherein (2) the anode further comprises at least one binder, and at least one conductive aid.

12. The cell of claim 11, wherein the at least one binder is present in an amount of approximately 5 to approximately 20 wt %.

13. A silicon-containing product, comprising:
    (i) silicon having an average particle size of less than approximately 100 nm,
    (ii) magnesium oxide, and
    (iii) magnesium silicate.

14. The silicon-containing product of claim 13, wherein the silicon has an average particle size of less than approximately 50 nm.

15. The silicon-containing product of claim 13, further comprising (iv) lithium.

16. The silicon-containing product of claim 13, comprising (i) at least approximately 80 wt % of the silicon.

17. The silicon-containing product of claim 13, comprising (i) at least approximately 85 wt % of the silicon.

18. The silicon-containing product of claim 13, comprising (ii) approximately 1.5 to 52 wt % of the magnesium oxide.

19. The silicon-containing product of claim 13, comprising (iii) approximately 11 to 29 wt % of the magnesium silicate.

20. The silicon-containing product of claim 13, comprising
    (i) at least approximately 80% of the silicon,
    (ii) at least approximately 1.5 wt % of the magnesium oxide, and
    (iii) at least approximately 11 wt % of the magnesium silicate.

21. A method of preparing the silicon-containing product of claim 13, comprising:
combining reactants comprising
(a) fumed silicon oxide, and
(b) a metal, and
heating the reactants to a temperature greater than approximately 100° C. to form the silicon having an average particle size of less than approximately 100 nm.

22. The method of claim 21, wherein the fumed silicon oxide has an average particle size of less than approximately 100 nm.

23. The method of claim 21, wherein the fumed silicon oxide has an average particle size of less than approximately 50 nm.

24. The method of claim 21, wherein the heating comprises a heating at a rate of less than approximately 5° C./min.

25. The method of claim 21, wherein the combining reactants comprises combining the fumed silicon oxide and an excess of the metal.

26. The method of claim 21, further comprising removing at least a portion of metal oxide formed on the silicon.

27. The method of claim 21, wherein the reactants further comprise a material capable of dissolving an oxide on the metal.

28. The method of claim 27, wherein the material comprises a halide.

29. The method of claim 21, wherein the reactants further comprise a lithium-containing material.

* * * * *